United States Patent
Hong et al.

(10) Patent No.: US 10,343,138 B2
(45) Date of Patent: Jul. 9, 2019

(54) PST-20 ZEOLITE, PREPARATION METHOD FOR THE SAME, AND SELECTIVE SEPARATION METHOD FOR CARBON DIOXIDE USING THE SAME

(71) Applicant: POSTECH ACADEMY-INDUSTRY FOUNDATION, Pohang-si (KR)

(72) Inventors: Suk Bong Hong, Pohang-si (KR); Jiho Shin, Bucheon-si (KR); Jung Gi Min, Pocheon-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 96 days.

(21) Appl. No.: 15/536,806

(22) PCT Filed: Nov. 24, 2015

(86) PCT No.: PCT/KR2015/012659
§ 371 (c)(1),
(2) Date: Jun. 16, 2017

(87) PCT Pub. No.: WO2016/108434
PCT Pub. Date: Jul. 7, 2016

(65) Prior Publication Data
US 2018/0036710 A1    Feb. 8, 2018

(30) Foreign Application Priority Data
Dec. 30, 2014 (KR) .................. 10-2014-0194129

(51) Int. Cl.
*C01B 39/48* (2006.01)
*B01J 20/18* (2006.01)
(Continued)

(52) U.S. Cl.
CPC .............. *B01J 20/18* (2013.01); *B01D 53/02* (2013.01); *B01D 53/04* (2013.01);
(Continued)

(58) Field of Classification Search
CPC .......... C01B 39/48; B01L 29/70; B01L 20/18; C01P 2002/72
See application file for complete search history.

(56) References Cited

U.S. PATENT DOCUMENTS

| 4,247,416 A | * | 1/1981 | Doherty ................... B01J 29/70 |
| | | | 423/705 |
| 2018/0036710 A1 | * | 2/2018 | Hong ..................... B01D 53/04 |

(Continued)

FOREIGN PATENT DOCUMENTS

| KR | 10-2001-0018274 | 3/2001 |
| KR | 10-1286077 | 7/2013 |
| KR | 10-1477415 | 12/2014 |

OTHER PUBLICATIONS

Guo et al. (A zeolite family with expanding structural complexity and embedded isoreticular structures, 2015, Nature, vol. 524, pp. 74-78 (Year: 2015).*
KIPO, Written Opinion of Application No. PCT/KR2015/012659, dated Mar. 8, 2016.
Golubeva, O. Yu et al., "Investigation of the Crystallization of Zeolites in tbe Si02—A1203—Na2O—K2O—(TEA)2O—H2O System," Glass Physics and Chemistry, 2011, vol. 37, No. 4, pp. 426-432, Aug. 2011.

(Continued)

*Primary Examiner* — David M Brunsman
(74) *Attorney, Agent, or Firm* — Lex IP Meister, PLLC

(57) ABSTRACT

The present invention relates to a PST-20 zeolite having a novel skeletal structure, its preparation method, and a selective separation and adsorption method for a gas using the PST-20 zeolite. More specifically, the present invention relates to a method of preparing a microporous aluminosilicate PST-20 zeolite having a novel skeletal structure totally different from the skeletal structure of known zeolites and using the PST-20 zeolite as an adsorbent/separator capable of selectively adsorbing/separating carbon dioxide to separate and collect carbon dioxide with high purity from burned gases or natural gases.

4 Claims, 17 Drawing Sheets

(51) Int. Cl.
  *B01D 53/04* (2006.01)
  *B01J 20/30* (2006.01)
  *B01D 53/02* (2006.01)
  *B01J 29/70* (2006.01)

(52) U.S. Cl.
  CPC ....... *B01J 20/3057* (2013.01); *B01J 20/3085* (2013.01); *C01B 39/48* (2013.01); *B01D 2253/108* (2013.01); *B01D 2253/1085* (2013.01); *B01D 2256/24* (2013.01); *B01D 2257/504* (2013.01); *B01D 2258/0283* (2013.01); *B01J 29/70* (2013.01); *C01P 2002/72* (2013.01); *C01P 2002/74* (2013.01); *C01P 2002/76* (2013.01); *C01P 2002/77* (2013.01); *Y02C 10/08* (2013.01); *Y02P 20/152* (2015.11)

(56) References Cited

U.S. PATENT DOCUMENTS

2018/0280924 A1* 10/2018 Maeda ................. B01J 20/3078
2018/0304242 A1* 10/2018 Martens ................... B01J 29/76

OTHER PUBLICATIONS

Lee, Young Jong et al., "Compositional and Kinetic Studies on the Crystallization of Zeolite Beta using Cost-efficient TEABr without Seed under Static and Stirred Conditions," Journal of Crystal Growth, 2006, vol. 297, No. 1, pp. 138-145, Available online Nov. 13, 2006.

Guo, Peng et al., "A Zeolite Family with Expanding Structural Complexity and Embedded Isoreticuiar Structures," Nature, Aug. 6, 2015, vol. 524, pp. 74-78.

* cited by examiner

PST-20 ZEOLITE, PREPARATION METHOD FOR THE SAME, AND SELECTIVE SEPARATION METHOD FOR CARBON DIOXIDE USING THE SAME

TECHNICAL FIELD

The present invention relates to a PST-20 zeolite having a novel skeletal structure, its preparation method, and a selective separation and adsorption method for a gas using the PST-20 zeolite. More specifically, the present invention relates to a method of preparing a microporous aluminosilicate PST-20 zeolite having a novel skeletal structure totally different from the skeletal structure of known zeolites and using the PST-20 zeolite as an adsorbent/separator capable of selectively adsorbing/separating carbon dioxide to separate and collect carbon dioxide with high purity from burned gases or natural gases.

BACKGROUND ART

Zeolites contain micropores having a uniform pore size distribution with a margin of error of 0.1 Å or less. Hence, these substances display their unique shape selectivity that does not appear in the amorphous oxides. Due to such a characteristic, zeolites are widely used as an ion-exchanger, a catalyst, or a catalyst support in various fields of fine chemistry, petroleum chemistry, etc. Particularly, zeolites are superior to other inorganic materials in regards to gas permeability and selectivity due to their molecular sieve effect that the substances being adsorbed into the micropores are determined by the size of the micropores and the molecules to be adsorbed. Besides, zeolites are excellent in thermal/mechanical stability and highly available as an adsorption-based eliminator or separator because of its ability to control the polarity through adjusting the Si/Al molar ratio or performing the cation exchange.

The organic structure directing agents (OSDAs) such as amine and alkyl ammonium ions have been used for several decades since the first introduction of the hydrothermal synthesis methods by Barrer and Milton in the 1940s, and 218 zeolites have been reported until 2014. The structures of the zeolites are disclosed in Atlas of Zeolite Structure Types, Butterworth 2007, http//www.iza-structure.org/.

The zeolites for commercial use need to meet some requirements such as micropore size, structure, acidity, hydrothermal stability, etc., as suitable to the applied fields, so only about eighteen types of zeolites, including LTA, FAU, MFI, MOR, BEA, FER, LTL, etc. are now commercially available.

The zeolite with novel skeletal structure and composition is very critical because it enables the innovative improvement of the existing chemical processes and the development of numerous processes of great importance from a commercial point of view. Accordingly, there is a continuous demand for a novel zeolite having a new structure.

DISCLOSURE OF INVENTION

It is an object of the present invention to provide a zeolite having a novel crystalline structure.

It is another object of the present invention to provide a method for preparing a zeolite having a novel crystalline structure.

It is still another object of the present invention to provide a method for separating carbon dioxide using a zeolite having a novel crystalline structure.

It is further another object of the present invention to prepare an aluminosilicate PST-20 zeolite having a skeletal structure totally different from that of the existing zeolites and to provide a aluminosilicate PST-20 zeolite and its preparation method in which the PST-20 zeolite is available as an ion exchanger, a catalyst or a catalyst support in various industrial processes in the fields of environment and energy, and particularly used as an adsorbent/separator in the separation and collection process for carbon dioxide.

To achieve the objects of the present invention, there is provided a PST-20 zeolite having a composition represented by the following chemical formula (I), $$0.1\sim10M_xO:1.0Al_2O_3:1.0\sim100SiO_2 \qquad (I)$$

Here, M is at least one selected from monovalent or divalent metal elements; and X is 1 or 2.

The PST-20 zeolite has a skeletal structure according to an XRD pattern presented in the following table 1.

TABLE 1

| 2θ | d | 100 × I/Io |
|---|---|---|
| 11.3~11.4 | 7.8~7.7 | S~VS |
| 12.0~12.1 | 7.4~7.3 | W |
| 12.7~12.8 | 7.0~6.9 | VS |
| 13.6~13.7 | 6.5~6.4 | S |
| 14.2~14.3 | 6.3~6.2 | W |
| 16.1~16.2 | 5.5~5.4 | M |
| 16.4~16.5 | 5.4~5.3 | W |
| 17.8~17.9 | 5.0~4.9 | VS |
| 19.3~19.4 | 4.6~4.5 | M~S |
| 19.7~19.8 | 4.5~4.4 | VS |
| 21.1~21.2 | 4.2~4.1 | W~M |
| 21.7~21.8 | 4.1~4.0 | M |
| 22.5~22.6 | 4.0~3.9 | W~M |
| 23.8~23.9 | 3.8~3.7 | M~S |
| 25.8~25.9 | 3.5~3.4 | W |
| 27.2~27.3 | 3.3~3.2 | S~VS |
| 27.7~27.8 | 3.3~3.2 | VS |
| 28.3~28.4 | 3.2~3.1 | S |
| 28.7~28.8 | 3.2~3.1 | VS |
| 29.2~29.3 | 3.1~3.0 | M~S |
| 32.2~32.3 | 2.8~2.7 | W~M |
| 32.6~32.7 | 2.8~2.7 | W |
| 33.1~33.2 | 2.8~2.7 | M~S |
| 33.9~34.0 | 2.7~2.6 | M~S |
| 34.0~34.1 | 2.7~2.6 | M~S |

In Table 1, θ is the Bragg angle; d is the lattice interval; and I is the intensity of an X-ray diffraction peak. All the powder X-ray diffraction data reported in the present invention including this powder X-ray diffraction pattern are measured using the standard X-ray diffraction method, using copper Kα radiation as a light source and an X-ray tube operated at 40 kV and 30 mA. The measurement is performed at a rate of 5 degree (2θ)/min from a powder specimen horizontally compressed. d and I are calculated from the 2θ value and the peak height of the observed X-ray diffraction peak. In terms of 100×I/Io, W is for weak (0~20); M is for medium (20~10); S is for strong (40~60); and VS is for very strong (60~100).

Hereinafter, the term "PST-20 (POSTECH Number 20)" as used herein refers to a zeolite having a skeletal structure with the composition of the chemical formula (I) and an X-ray diffraction pattern including lattice intervals at least as given in Table 1 according to the above measurement results. There has never been reported a zeolite having the same skeletal structure of the PST-20 zeolite in the documentation [Atlas of Zeolite Structure Types, Butterworth 2007], [http//www.iza-structure.org/].

In the present invention, the ratio of $Al_2O_3$ to $SiO_2$ in the zeolite is preferably 1.0 $Al_2O_3$:2-25 $SiO_2$, more preferably 1 $Al_2O_3$:2-10 $SiO_2$. 2θ, d and 100× I/Io of the table 1 may be represented as in the following table 2.

TABLE 2

| 2θ | d | 100 × I/Io |
|---|---|---|
| 11.3~11.4 | 7.8~7.7 | 60~65 |
| 12.0~12.1 | 7.4~7.3 | 10~15 |
| 12.7~12.8 | 7.0~6.9 | 90~95 |
| 13.6~13.7 | 6.5~6.4 | 50~55 |
| 14.2~14.3 | 6.3~6.2 | 15~20 |
| 16.1~16.2 | 5.5~5.4 | 25~30 |
| 16.4~16.5 | 5.4~5.3 | 10~15 |
| 17.8~17.9 | 5.0~4.9 | 65~70 |
| 19.3~19.4 | 4.6~4.5 | 35~40 |
| 19.7~19.8 | 4.5~4.4 | 65~70 |
| 21.1~21.2 | 4.2~4.1 | 15~20 |
| 21.7~21.8 | 4.1~4.0 | 25~30 |
| 22.5~22.6 | 4.0~3.9 | 15~20 |
| 23.8~23.9 | 3.8~3.7 | 40~45 |
| 25.8~25.9 | 3.5~3.4 | 10~15 |
| 27.2~27.3 | 3.3~3.2 | 55~60 |
| 27.7~27.8 | 3.3~3.2 | 100 |
| 28.3~28.4 | 3.2~3.1 | 50~55 |
| 28.7~28.8 | 3.2~3.1 | 90~95 |
| 29.2~29.3 | 3.1~3.0 | 40~45 |
| 32.2~32.3 | 2.8~2.7 | 15~20 |
| 32.6~32.7 | 2.8~2.7 | 10~15 |
| 33.1~33.2 | 2.8~2.7 | 40~45 |
| 33.9~34.0 | 2.7~2.6 | 40~45 |
| 34.0~34.1 | 2.7~2.6 | 40~41 |

In Table 2, θ is the Bragg angle; d is the lattice interval; and I is the intensity of an X-ray diffraction peak. All the powder X-ray diffraction data reported in the present invention including this powder X-ray diffraction pattern are measured using the standard X-ray diffraction method, using copper Kα ray as a light source and an X-ray tube operated at 40 kV and 30 mA. The measurement is performed at a rate of 5 degree (2θ)/min from a powder specimen horizontally compressed. d and I are calculated from the 2θ value and the peak height of the observed X-ray diffraction peak.

In the present invention, the univalent or divalent metal elements are preferably alkali metals or alkali earth metals, including Li, Na, K, Rb, Cs, Fr, Be, Mg, Ca, Sr, Ba, Ra, etc.

The ratio of $M_xO$ to $Al_2O_3$ is preferably 0.2-5.0 $M_xO$:1.0 $Al_2O_3$, more preferably 0.5-2.0 $M_xO$:1.0 $Al_2O_3$.

In one preferred embodiment of the present invention, the zeolite has a composition of 0.5-2.0 $M_xO$:1.0 $Al_2O_3$:1-10 $SiO_2$.

In the present invention, the PST-20 zeolite belongs to a space group Im3m with a cubic crystal system, where the lengths a, b and c of crystal axes of a unit cell are all about 50 Å or greater, preferably 55 Å. FIG. 1 shows the structure of the PST-20 zeolite determined through the X-ray diffraction analysis and high-resolution transmission electron microscopy. The PST-20 zeolite is a microporous substance that contains a variety of holes formed from eight oxygen rings.

In the present invention, the PST-20 zeolite may be prepared by adjusting the ratios of $SiO_2/Al_2O_3$ and $NaOH/SiO_2$ and the type and amount of the alkali metal or alkali earth metal and performing hydrothermal crystallization using TEA ion or 18-crown-6 as an organic structure directing agent (OSDA).

The TEA is an organic structure directing agent (OSDA), such as BEA, BPH, CHA, FAU, LTA, MFI, OFF, etc., used in the synthesis of various zeolites.

In an embodiment of the present invention, the zeolite of the present invention may be prepared as follows. 1 to 5 moles of an aqueous solution of univalent sodium hydroxide (NaOH) is added to 1 mole of aluminum oxide $(Al(OH)_3.H_2O)$, and the mixture is agitated for one hour to prepare a first solution. 3 to 10 moles of silica sol or amorphous silica is dissolved in 1 mole of aluminum oxide, and 0.05 to 3 moles of divalent nitrate (calcium nitrate $(Ca(NO_3)_2)$, strontium nitrate $(Sr(NO_3)_2)$, or barium nitrate $(Ba(NO_3)_2))$ is added. Then, 1 to 10 moles of tetraethylammonium bromide (TEABr) is added as an organic structure directing agent (OSDA). The mixture is agitated for one hour to prepare a second solution. Subsequently, the first solution is added dropwise to the second solution, and the mixed solution is agitated at the room temperature for 24 hours to obtain a reaction mixture represented by the following chemical formula (II).

$$1.0\text{-}10.0TEABr:0.05\text{-}3.0M_{II}(NO_3)_2:1.0\text{-}5.0Na_2O:\\1.0Al_2O_3:3.0\text{-}10.0SiO_2:100\text{-}1000H_2O \quad (II)$$

In this regard, $M_{II}$ is Ca, Sr, or Ba.

The reaction mixture obtained by the above-described procedures and reagents is moved to a Teflon reactor, put into a stainless steel container and then heated up at 100 to 180° C. for hours to 7 days, preferably for 36 to 48 hours. An excessively long heating time may transform the structure of the reaction mixture due to a long-term heating.

In order to raise the purity of the PST-20 zeolite, it is desirable to use a small amount of the PST-20 zeolite as a seed in the step of mixing the second solution with the first solution.

In one aspect of the present invention, there is provided a method of separating carbon dioxide that includes having an air current containing carbon dioxide in contact with a dehydrated PST-20 zeolite to selectively adsorb the carbon dioxide.

In the present invention, the dehydration of the PST-20 zeolite may be achieved by heating at 300° C. for a defined period of time. The PST-20 zeolite completely dehydrated under the given conditions has a crystalline structure represented by the X-ray diffraction data of Table 3.

TABLE 3

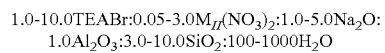

| 2θ | d | 100 × I/Io |
|---|---|---|
| 11.7~11.8 | 7.6~7.5 | VS |
| 11.9~12.0 | 7.4~7.3 | M |
| 12.4~12.5 | 7.2~7.1 | W~M |
| 13.0~13.1 | 6.8~6.7 | VS |
| 14.1~14.2 | 6.3~6.2 | M~S |
| 14.6~14.7 | 6.1~6.0 | W~M |
| 15.8~15.9 | 5.6~5.5 | M~S |
| 16.6~16.7 | 5.4~5.3 | M |
| 16.9~17.0 | 5.3~5.2 | S |
| 18.3~18.4 | 4.9~4.8 | S |
| 19.9~20.0 | 4.5~4.4 | M |
| 20.3~20.4 | 4.4~4.3 | M |
| 21.8~21.9 | 4.1~4.0 | W |
| 23.2~23.3 | 3.9~3.8 | W~M |
| 23.9~24.0 | 3.8~3.7 | W |
| 24.5~24.6 | 3.7~3.6 | M |
| 28.1~28.2 | 3.2~3.1 | M |
| 28.5~28.6 | 3.2~3.1 | S |
| 29.2~29.3 | 3.1~3.0 | M |
| 29.7~29.8 | 3.1~3.0 | S |
| 30.2~30.3 | 3.0~2.9 | M |
| 34.2~34.3 | 2.7~2.6 | W |
| 35.1~35.2 | 2.6~2.5 | W |

In Table 3, θ is the Bragg angle; d is the lattice interval; and I is the intensity of an X-ray diffraction peak. All the powder X-ray diffraction data reported in the present invention including this powder X-ray diffraction pattern are measured using the standard X-ray diffraction method, using copper Kα radiation as a light source and an X-ray tube operated at 40 kV and 30 mA. The measurement is performed at a rate of 5 degree (2θ)/min from a powder specimen horizontally compressed. d and I are calculated from the 2θ value and the peak height of the observed X-ray diffraction peak. In terms of 100×I/Io, W is for weak (0~20); M is for medium (20~40); S is for strong (40~60); and VS is for very strong (60~100).

In a preferred embodiment of the present invention, the dehydrated PST-20 zeolite of the Table 3 may be represented as in the following table 4.

TABLE 4

| 2θ | d | 100 × I/Io |
|---|---|---|
| 11.7~11.8 | 7.6~7.5 | 85~90 |
| 11.9~12.0 | 7.4~7.3 | 25~30 |
| 12.4~12.5 | 7.2~7.1 | 15~20 |
| 13.0~13.1 | 6.8~6.7 | 100 |
| 14.1~14.2 | 6.3~6.2 | 35~40 |
| 14.6~14.7 | 6.1~6.0 | 15~20 |
| 15.8~15.9 | 5.6~5.5 | 45~50 |
| 16.6~16.7 | 5.4~5.3 | 25~30 |
| 16.9~17.0 | 5.3~5.2 | 45~50 |
| 18.3~18.4 | 4.9~4.8 | 45~50 |
| 19.9~20.0 | 4.5~4.4 | 30~35 |
| 20.3~20.4 | 4.4~4.3 | 30~35 |
| 21.8~21.9 | 4.1~4.0 | 10~15 |
| 23.2~23.3 | 3.9~3.8 | 15~20 |
| 23.9~24.0 | 3.8~3.7 | 10~15 |
| 24.5~24.6 | 3.7~3.6 | 25~30 |
| 28.1~28.2 | 3.2~3.1 | 30~35 |
| 28.5~28.6 | 3.2~3.1 | 45~50 |
| 29.2~29.3 | 3.1~3.0 | 20~25 |
| 29.7~29.8 | 3.1~3.0 | 55~60 |
| 30.2~30.3 | 3.0~2.9 | 23~30 |
| 34.2~34.3 | 2.7~2.6 | 10~15 |
| 35.1~35.2 | 2.6~2.5 | 15~20 |

In Table 4, θ is the Bragg angle; d is the lattice interval; and I is the intensity of an X-ray diffraction peak. All the powder X-ray diffraction data reported in the present invention including this powder X-ray diffraction pattern are measured using the standard X-ray diffraction method, using copper Kα ray as a light source and an X-ray tube operated at 40 kV and 30 mA. The measurement is performed at a rate of 5 degree (2θ)/min from a powder specimen horizontally compressed. d and I are calculated from the 2θ value and the peak height of the observed X-ray diffraction peak.

If not limited theoretically, the PST-20 zeolite of the present invention selectively adsorbs carbon dioxide through the molecular door mechanism disclosed in the reference documentation (Webley et al., *Journal of the American Chemical Society*, 134, (2012), 19246-19253). In other words, the PST-20 zeolite with micropores and hollow holes contains sodium cations ($Na^+$) at the mouth of the micropores that interact only with the carbon dioxide gas having high quadrupole moment and high polarizability, so it selectively adsorbs carbon dioxide other than methane or nitrogen gas having very low quadrupole moment and low polarizability.

Effects of the Invention

The present invention prepares a novel zeolite having large-sized pores that belongs to a space group Im3m with a cubic crystal system in which the lengths a, b and c of crystal axes of a unit cell are all about 50 Å or greater.

In addition, the present invention provides a novel adsorbent capable of selectively adsorbing carbon dioxide using the zeolite.

BRIEF DESCRIPTIONS OF DRAWINGS

FIG. 1 shows the structure of an aluminosilicate PST-20 zeolite prepared in Example 2.

FIG. 2 presents the results of the X-ray diffraction (XRD) analysis of an aluminosilicate PST-20 zeolite prepared in Example 1.

FIG. 3 presents the results of the X-ray diffraction (XRD) analysis of the aluminosilicate PST-20 zeolite prepared in Example 2.

FIG. 4 shows the scanning electron microscope (SEM) image of the aluminosilicate PST-20 zeolite prepared in Example 2.

FIG. 5 presents the results of the X-ray diffraction (XRD) analysis of an aluminosilicate PST-20 containing an analcime zeolite as an impurity as prepared in Comparative Example 2-1.

FIG. 6 presents the results of the X-ray diffraction (XRD) analysis of an aluminosilicate PST-20 zeolite prepared in Example 3.

FIG. 7 presents the results of the X-ray diffraction (XRD) analysis of an aluminosilicate PST-20 zeolite prepared in Example 4.

FIG. 8 presents the results of the X-ray diffraction (XRD) analysis of an aluminosilicate PST-20 zeolite prepared in Example 5.

FIG. 9 presents the results of the X-ray diffraction (XRD) analysis of an aluminosilicate PST-20 zeolite prepared in Example 6.

FIG. 10 presents the results of the adsorption isotherm that measures the adsorbed amount of carbon dioxide while continuously varying the pressure of the carbon dioxide gas at 25° C., according to Example 7.

FIG. 11 presents the results of the adsorption isotherm that measures the adsorbed amount of nitrogen while continuously varying the pressure of the nitrogen gas at 25° C., according to Example 7-1.

FIG. 12 presents the results of the adsorption isotherm that measures the adsorbed amount of methane while continuously varying the pressure of the methane gas at 25° C., according to Example 7-2.

FIG. 13 presents the results of the adsorption isotherm that measures the adsorbed amount of carbon dioxide while continuously varying the pressure of the carbon dioxide gas at 25° C. using a calcined PST-20 zeolite, according to Example 8.

FIG. 14 presents the results of the adsorption isotherm that measures the adsorbed amount of carbon dioxide while continuously varying the pressure of the carbon dioxide gas at ° C. using a nitrogen ion ($Na^+$)-exchanged PST-20 zeolite, according to Example 9.

BEST MODES FOR CARRYING OUT THE INVENTION

Hereinafter, the present invention will be described in detail with reference to the following examples, which are only to explain the present invention and not construed to limit the scope of the present invention.

Example 1: Preparation of PST-20 Zeolite

In a plastic beaker, 0.72 g of 50 wt. % sodium hydroxide (NaOH) was added to 4.82 g of deionized water. After adding 0.46 g of aluminum hydroxide ($Al(OH)_3 \cdot H_2O$), the resultant mixture was agitated for one hour to prepare an aqueous solution A. Apart from this, 2.57 g of colloidal silica sol (Ludox As-40), 0.25 g of strontium nitrate ($Sr(NO_3)_2$) and 2.66 g of TEABr were added to 9.64 g of deionized water, and the resultant mixture was agitated for one hour to prepare an aqueous solution B. The aqueous solution A was slowly added to the aqueous solution B, and the mixed solution was agitated for 24 hours to obtain a reaction mixture having the composition of the following chemical formula 1.

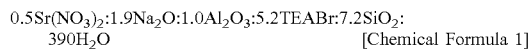

$0.5Sr(NO_3)_2 : 1.9Na_2O : 1.0Al_2O_3 : 5.2TEABr : 7.2SiO_2 : 390H_2O$     [Chemical Formula 1]

The reaction mixture thus obtained was moved to a Teflon reactor, put into a stainless steel container and heated at 145° C. for 4 days to yield a solid product, which was then repeatedly washed with water and dried at the room temperature.

The solid powder obtained in Example 1 was subjected to an X-ray diffraction analysis. According to the results of the X-ray diffraction analysis, the aluminosilicate PST-20 zeolite had no same X-ray diffraction pattern of the existing zeolites. This implicitly shows that the PST-20 zeolite had a totally new skeletal structure that had never been known. A small amount of ZSM-25 zeolite impurity was also observed.

Example 2: Preparation of PST-20 Zeolite

Figure 1:
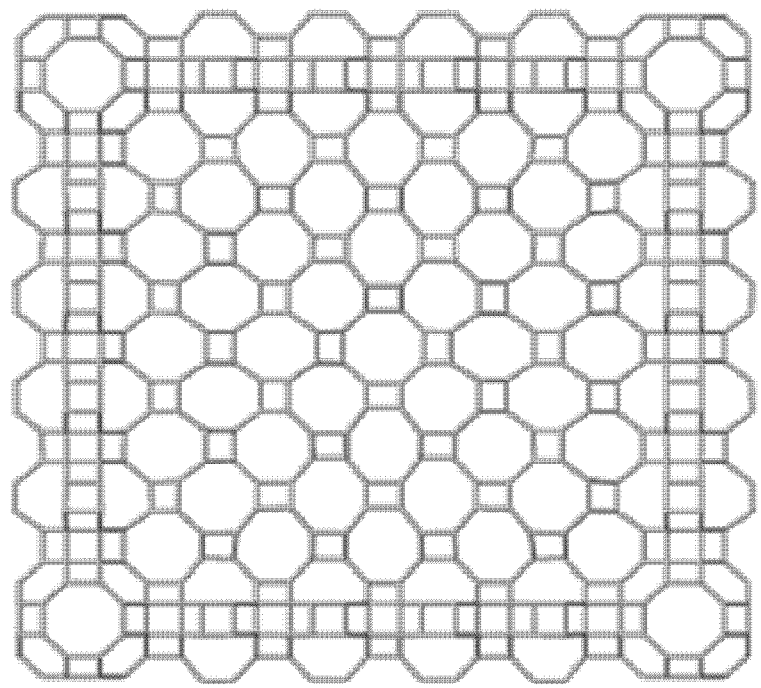
Figure 2:
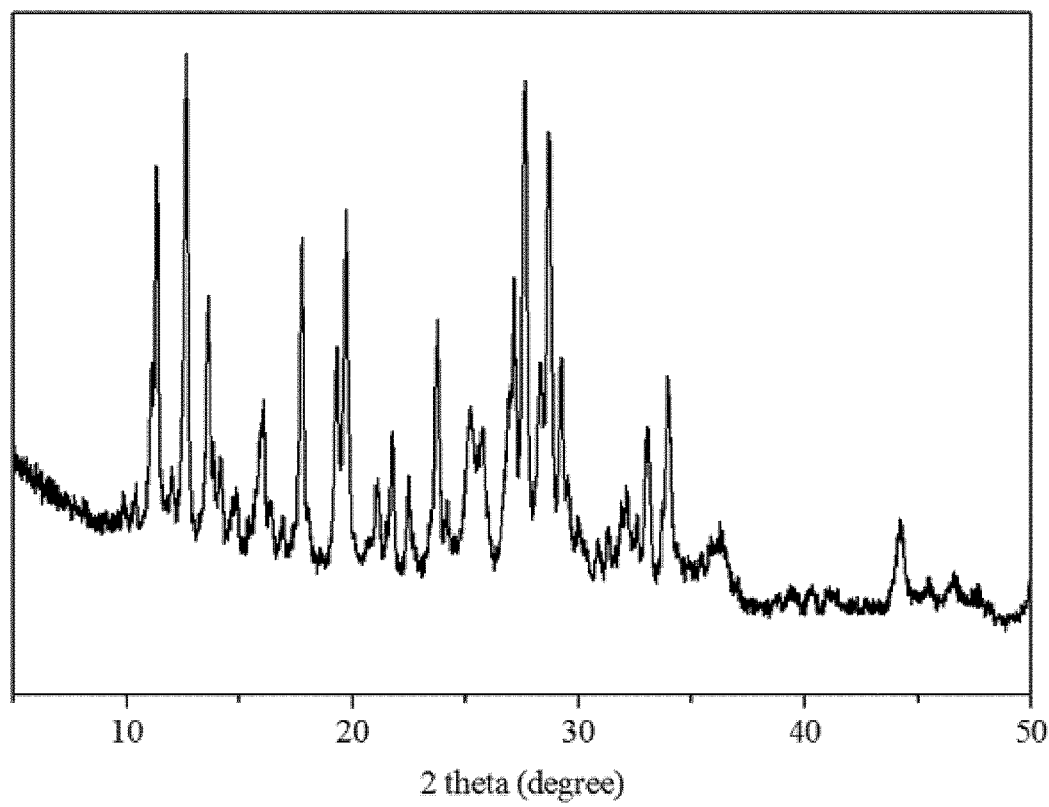
Figure 3:
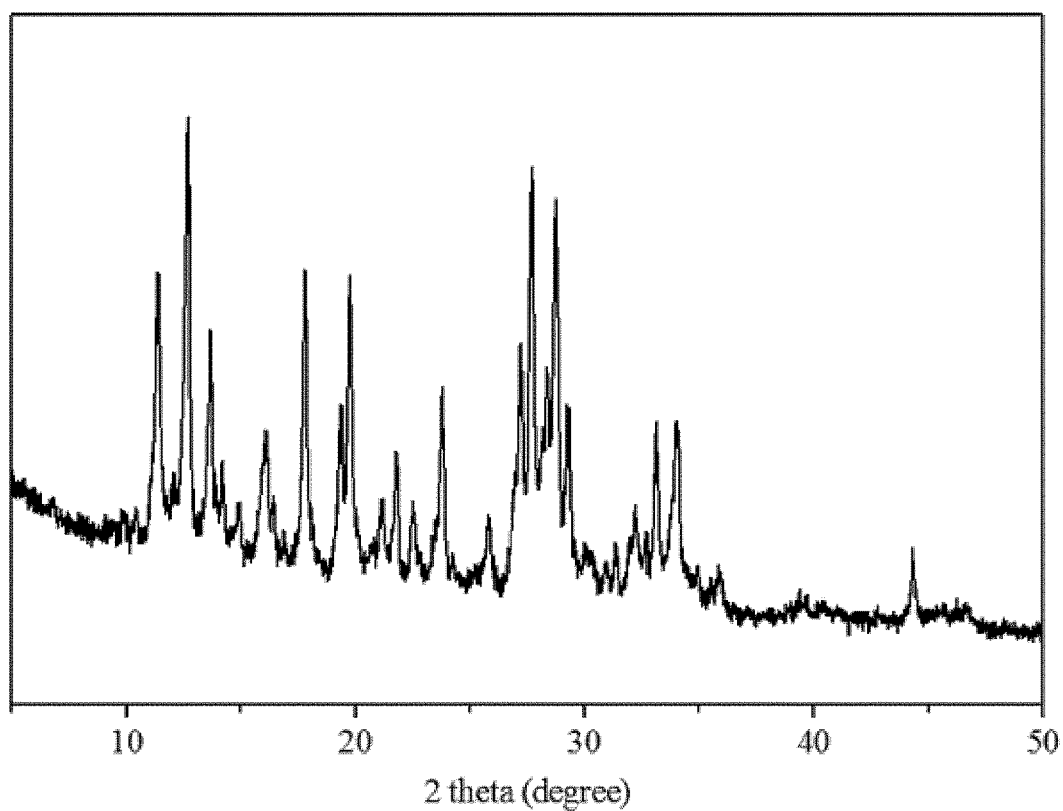

In a plastic beaker, 0.72 g of 50 wt. % sodium hydroxide (NaOH) was added to 4.82 g of deionized water. After adding 0.46 g of aluminum hydroxide ($Al(OH)_3 \cdot H_2O$), the resultant mixture was agitated for one hour to prepare an aqueous solution A. Apart from this, 2.57 g of colloidal silica sol (Ludox As-40), 0.25 g of strontium nitrate ($Sr(NO_3)_2$) and 2.66 g of TEABr were added to 9.64 g of deionized water, and the resultant mixture was agitated for one hour to prepare an aqueous solution B. The aqueous solution A was slowly added to the aqueous solution B. 0.021 g of the PST-20 zeolite obtained in Example 1 was added as a seed to the mixed solution, which was then agitated for 24 hours to obtain a reaction mixture having the composition of the chemical formula 1. Subsequently, the reaction mixture thus obtained was moved to a Teflon reactor, put into a stainless steel container and heated at 145° C. for 48 hours to yield a solid product. The solid product was repeatedly washed with water and dried at the room temperature. The solid powder obtained in Example 2 was subjected to an X-ray diffraction analysis. The results of the X-ray diffraction analysis are presented in Table 7 and FIG. 3.

TABLE 7

| 2θ | d | 100 × I/Io |
|---|---|---|
| 11.3~11.4 | 7.8~7.7 | 62 |
| 12.0~12.1 | 7.4~7.3 | 15 |
| 12.7~12.8 | 7.0~6.9 | 93 |
| 13.6~13.7 | 6.5~6.4 | 42 |
| 14.2~14.3 | 6.3~6.2 | 17 |
| 16.1~16.2 | 5.5~5.4 | 29 |
| 16.4~16.5 | 5.4~5.3 | 14 |
| 17.8~17.9 | 5.0~4.9 | 70 |
| 19.3~19.4 | 4.6~4.5 | 37 |
| 19.7~19.8 | 4.5~4.4 | 67 |
| 21.1~21.2 | 4.2~4.1 | 15 |
| 21.7~21.8 | 4.1~4.0 | 29 |
| 22.5~22.6 | 4.0~3.9 | 17 |
| 23.8~23.9 | 3.8~3.7 | 43 |
| 25.8~25.9 | 3.5~3.4 | 14 |
| 27.2~27.3 | 3.3~3.2 | 57 |
| 27.7~27.8 | 3.3~3.2 | 100 |
| 28.3~28.4 | 3.2~3.1 | 53 |
| 28.7~28.8 | 3.2~3.1 | 92 |
| 29.2~29.3 | 3.1~3.0 | 44 |
| 32.2~32.3 | 2.8~2.7 | 20 |
| 32.6~32.7 | 2.8~2.7 | 14 |
| 33.1~33.2 | 2.8~2.7 | 41 |
| 33.9~34.0 | 2.7~2.6 | 44 |

The synthesized product was the PST-20 zeolite of the following chemical formula 1-1 without ZSM-25 zeolite as an impurity.

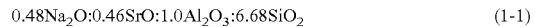

$0.48Na_2O : 0.46SrO : 1.0Al_2O_3 : 6.68SiO_2$     (1-1)

According to a thermogravimetric analysis and an element analysis of the solid powder obtained in Example 2, the PST-20 zeolite contained about 10.5 wt. % of water and 5.0 wt. % of TEA cations. Further, an inductive coupled plasma (ICP) analysis showed that the Si/Al ratio of the product was 3.3.

Figure 4:
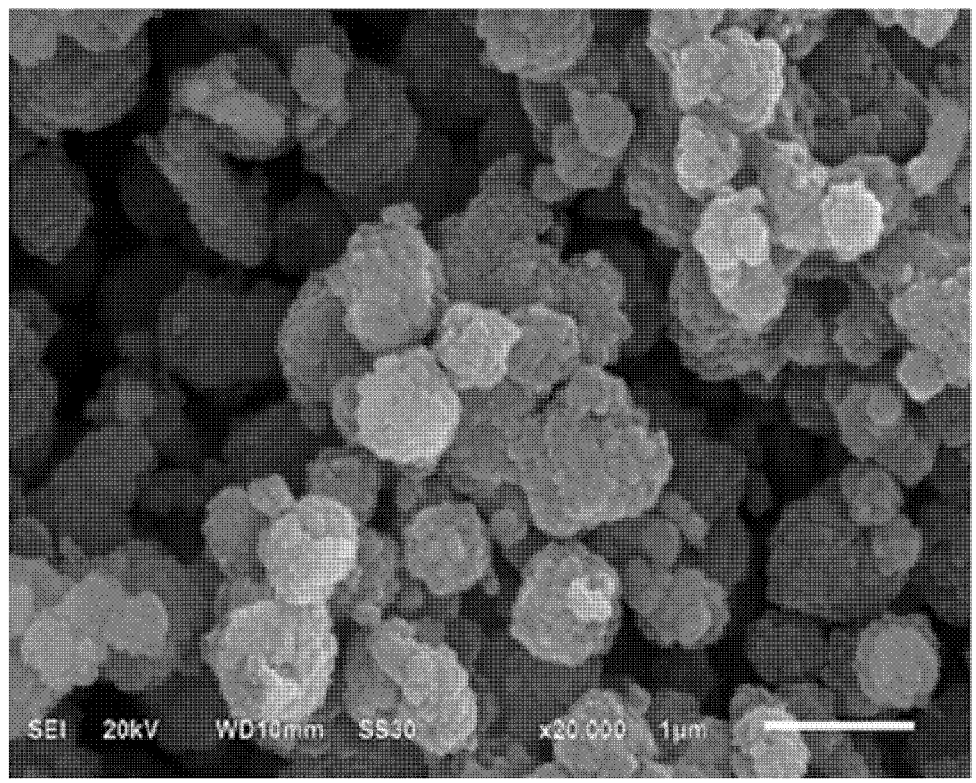

The scanning electron microscopy (SEM) was performed to make it sure that the PST-20 zeolite was a pure substance without a physical mixture. As a result, very uniform plate crystals were observed, but no other crystal forms appeared (Refer to FIG. 4).

Comparative Example 2-1: (Increase in Reaction Time)

Figure 5:
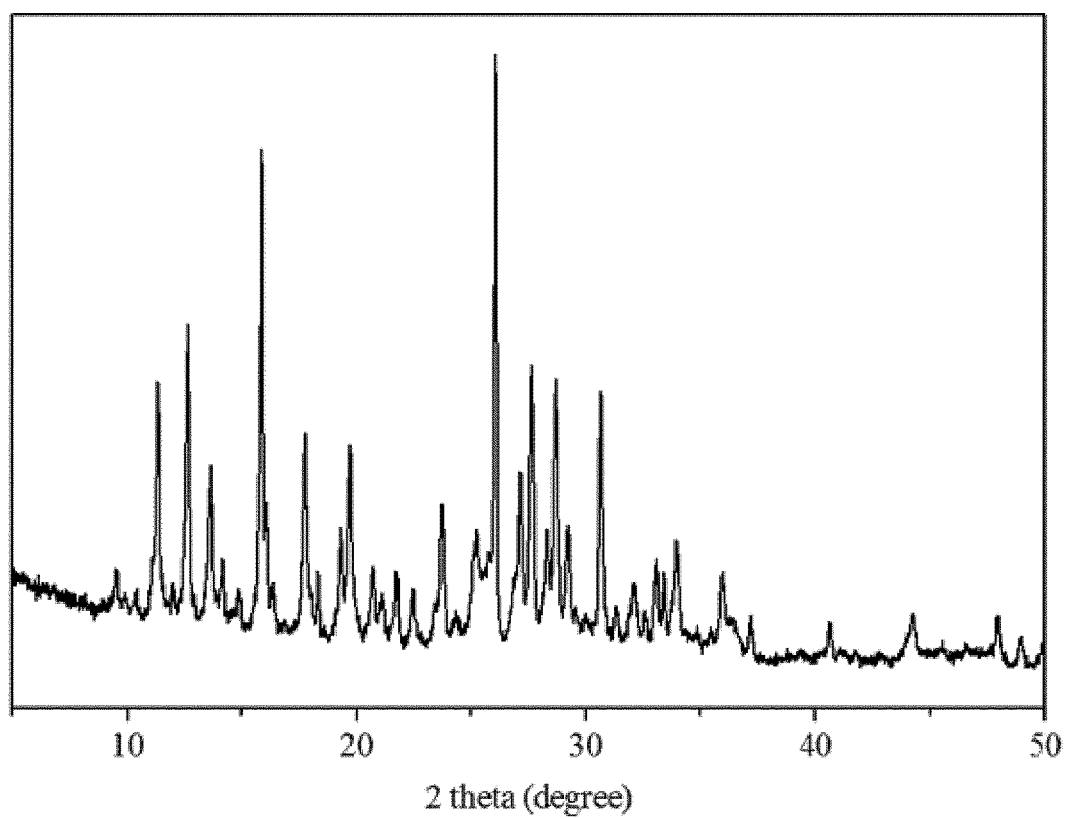

The procedures were performed in the same manner as described in Example 2, excepting that the final reaction mixture was heated at 145° C. for 14 days to obtain a solid product, which was repeated washed with water and then dried at the room temperature. According to the results (FIG. 5) of the X-ray diffraction analysis of the solid powder obtained in Comparative Example 2-1, the PST-20 zeolite had a great decrease in the degree of crystallization and an analcime zeolite was formed as an impurity.

Example 3: Preparation of PST-20 Zeolite

In a plastic beaker, 0.76 g of 50 wt. % sodium hydroxide (NaOH) was added to 5.04 g of deionized water. After adding 0.48 g of aluminum hydroxide ($Al(OH)_3 \cdot H_2O$), the resultant mixture was agitated for one hour to prepare an aqueous solution A. Apart from this, 2.70 g of colloidal silica sol (Ludox As-40), 0.15 g of calcium nitrate ($Ca(NO_3)_2$) and 2.79 g of TEABr were added to 10.08 g of deionized water, and the resultant mixture was agitated for one hour to prepare an aqueous solution B. The aqueous solution A was slowly added to the aqueous solution B, and the mixed solution was agitated for 24 hours to obtain a reaction mixture having the composition of the following chemical formula 2.

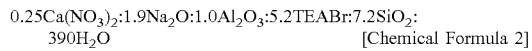
[Chemical Formula 2]

The reaction mixture thus obtained was moved to a Teflon reactor, put into a stainless steel container and heated at 150° C. for 7 days to yield a solid product, which was then repeatedly washed with water and dried at the room temperature.

Figure 6:
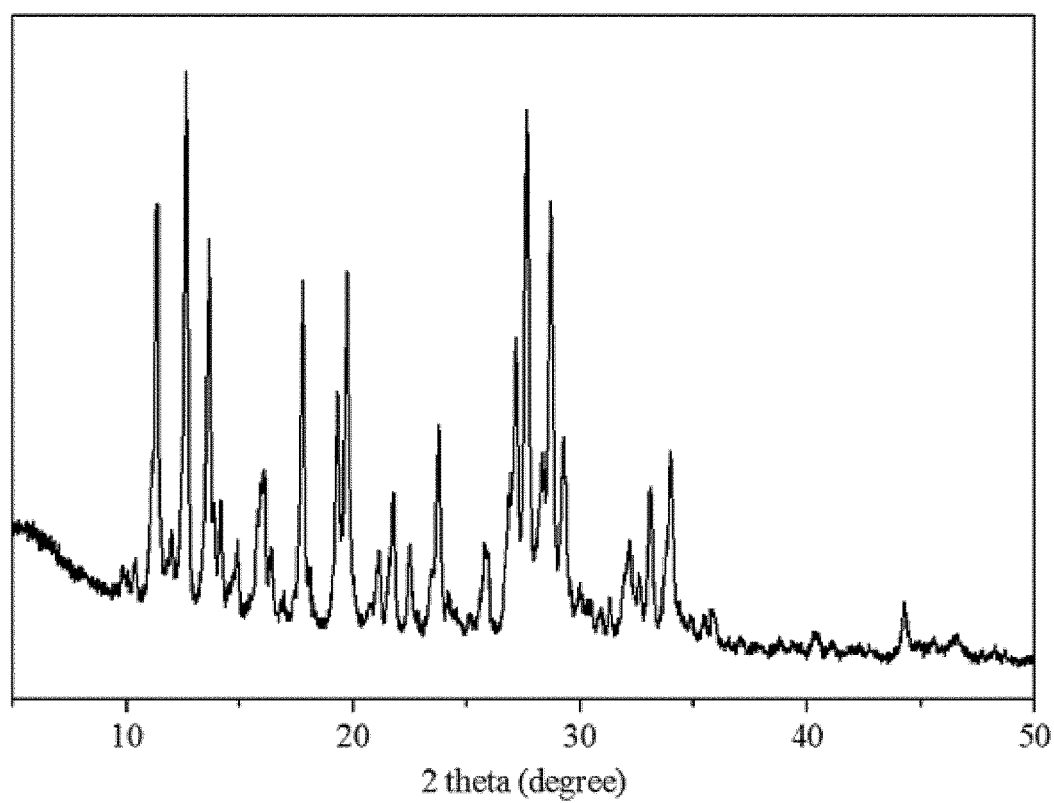

The solid powder obtained in Example 3 was subjected to an X-ray diffraction analysis. The results of the X-ray diffraction analysis are presented in FIG. 6. The product of Example 3 contained a small amount of the Na-P1 (GIS) zeolite impurity, but none of the ZSM-25 zeolite impurity.

Example 4: Preparation of PST-20 Zeolite

In a plastic beaker, 0.76 g of 50 wt. % sodium hydroxide (NaOH) was added to 5.06 g of deionized water. After adding 0.48 g of aluminum hydroxide (Al(OH)$_3$.H$_2$O), the resultant mixture was agitated for one hour to prepare an aqueous solution A. Apart from this, 2.70 g of colloidal silica sol (Ludox As-40), 0.33 g of barium nitrate (Ba(NO$_3$)$_2$) and 2.79 g of TEABr were added to 10.12 g of deionized water, and the resultant mixture was agitated for one hour to prepare an aqueous solution B. The aqueous solution A was slowly added to the aqueous solution B, and the mixed solution was agitated for 24 hours to obtain a reaction mixture having the composition of the following chemical formula 3.

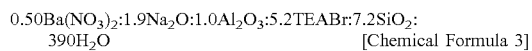
[Chemical Formula 3]

The reaction mixture thus obtained was moved to a Teflon reactor, put into a stainless steel container and heated at 145° C. for 4 days to yield a solid product, which was then repeatedly washed with water and dried at the room temperature.

Figure 7:
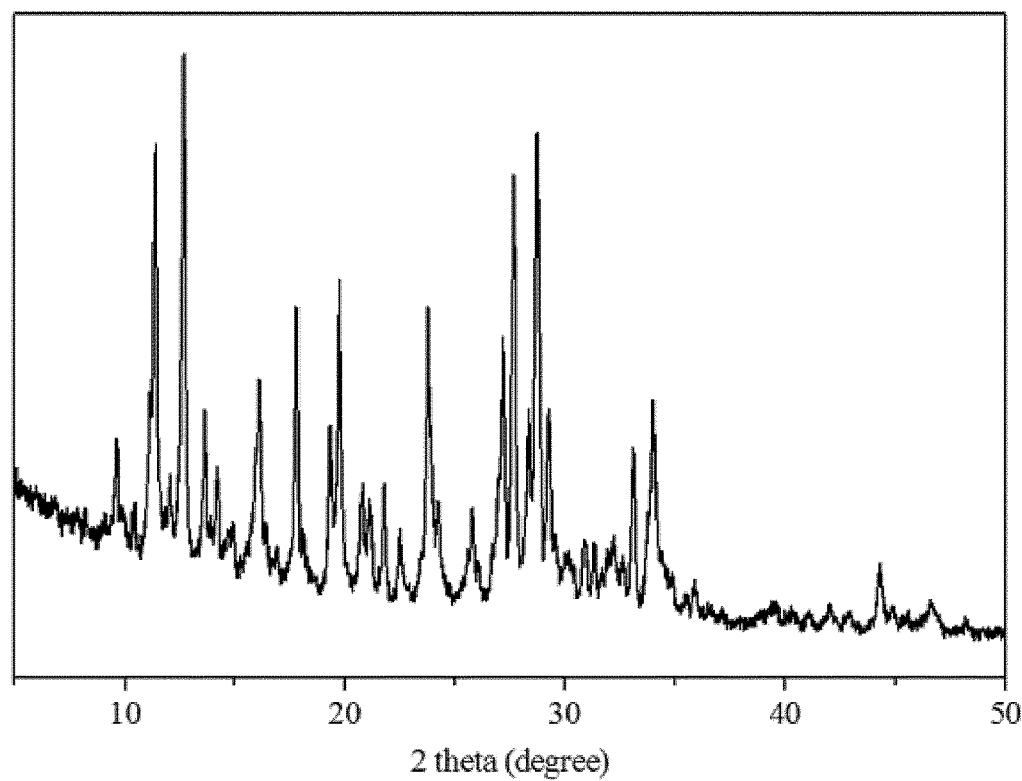

The solid powder obtained in Example 4 was subjected to an X-ray diffraction analysis. The results of the X-ray diffraction analysis are presented in FIG. 7. The product of Example 4 contained a small amount of the Na-P1 (GIS) zeolite impurity, but none of the ZSM-25 zeolite impurity.

Example 5: Preparation of PST-20 Zeolite

In a plastic beaker, 0.30 g of 50 wt. % sodium hydroxide (NaOH) was added to 2.03 g of deionized water. After adding 0.19 g of aluminum hydroxide (Al(OH)$_3$.H$_2$O), the resultant mixture was agitated for one hour to prepare an aqueous solution A. Apart from this, 1.08 g of colloidal silica sol (Ludox As-40), 0.05 g of potassium nitrate (KNO$_3$), 0.84 g of TEABr, and 0.35 g of 18-crown-6 were added to 4.05 g of deionized water, and the resultant mixture was agitated for one hour to prepare an aqueous solution B. The aqueous solution A was slowly added to the aqueous solution B, and the mixed solution was agitated for 24 hours to obtain a reaction mixture having the composition of the following chemical formula 4.

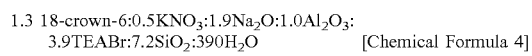
[Chemical Formula 4]

The reaction mixture thus obtained was moved to a Teflon reactor, put into a stainless steel container and heated at 150° C. for 5 days to yield a solid product, which was then repeatedly washed with water and dried at the room temperature to obtain a solid powder.

Figure 8:
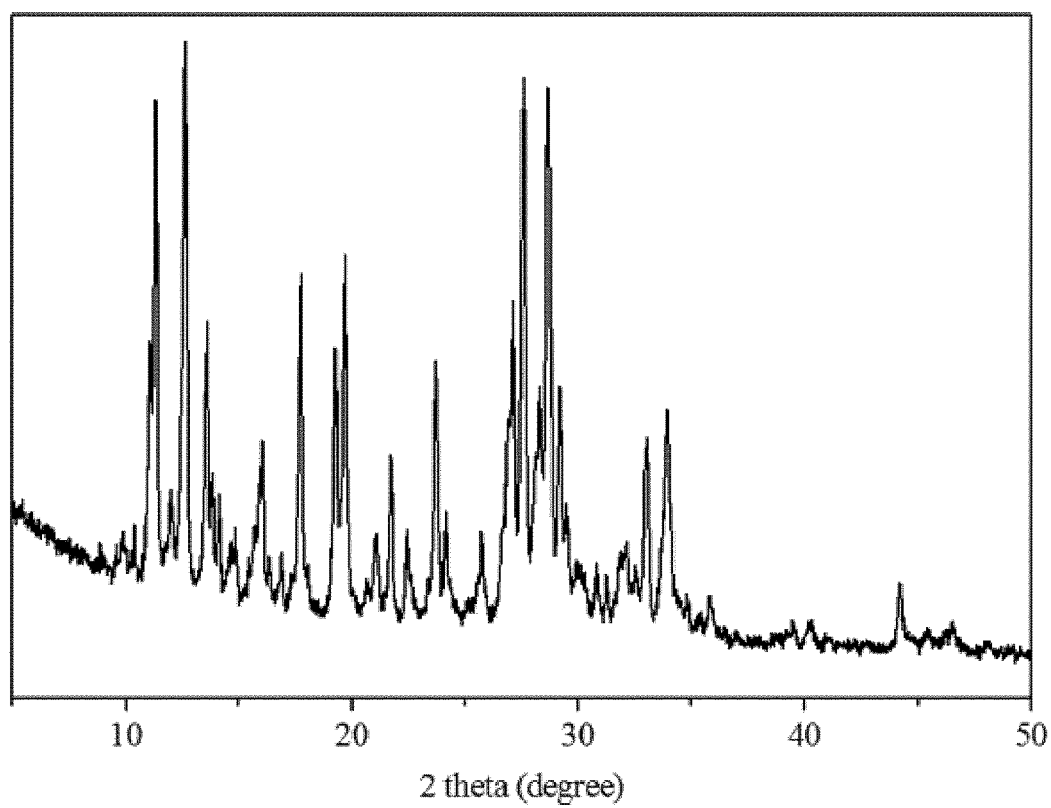

The solid powder obtained in Example 5 was subjected to an X-ray diffraction analysis. The results of the X-ray diffraction analysis are presented in FIG. 8. The product of Example 5 contained a small amount of the ZSM-25 zeolite impurity.

Example 6: Preparation of PST-20 Zeolite Using RbNO$_3$ and 18-Crown-6

In a plastic beaker, 0.30 g of 50 wt. % sodium hydroxide (NaOH) was added to 2.03 g of deionized water. After adding 0.19 g of aluminum hydroxide (Al(OH)$_3$.H$_2$O), the resultant mixture was agitated for one hour to prepare an aqueous solution A. Apart from this, 1.08 g of colloidal silica sol (Ludox As-40), 0.08 g of rubidium nitrate (RbNO$_3$), 0.84 g of TEABr, and 0.35 g of 18-crown-6 were added to 4.05 g of deionized water, and the resultant mixture was agitated for one hour to prepare an aqueous solution B. The aqueous solution A was slowly added to the aqueous solution B, and the mixed solution was agitated for 24 hours to obtain a reaction mixture having the composition of the following chemical formula 5.

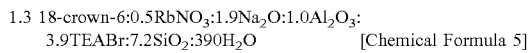
[Chemical Formula 5]

The reaction mixture thus obtained was moved to a Teflon reactor, put into a stainless steel container and heated at 150° C. for 5 days to yield a solid product, which was then repeatedly washed with water and dried at the room temperature.

Figure 9:
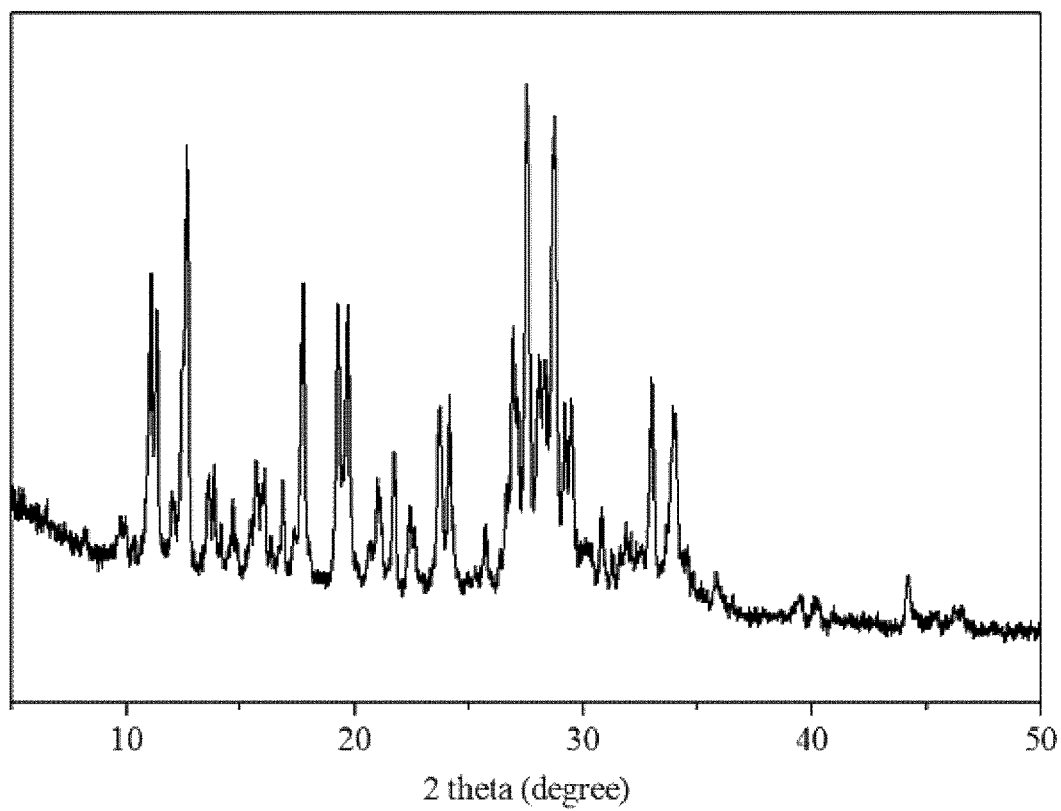

The solid powder obtained in Example 6 was subjected to an X-ray diffraction analysis. The results of the X-ray diffraction analysis are presented in FIG. 9. The product of Example 6 contained a small amount of the ZSM-25 zeolite impurity.

Example 7: Adsorption of Carbon Dioxide

Figure 10:
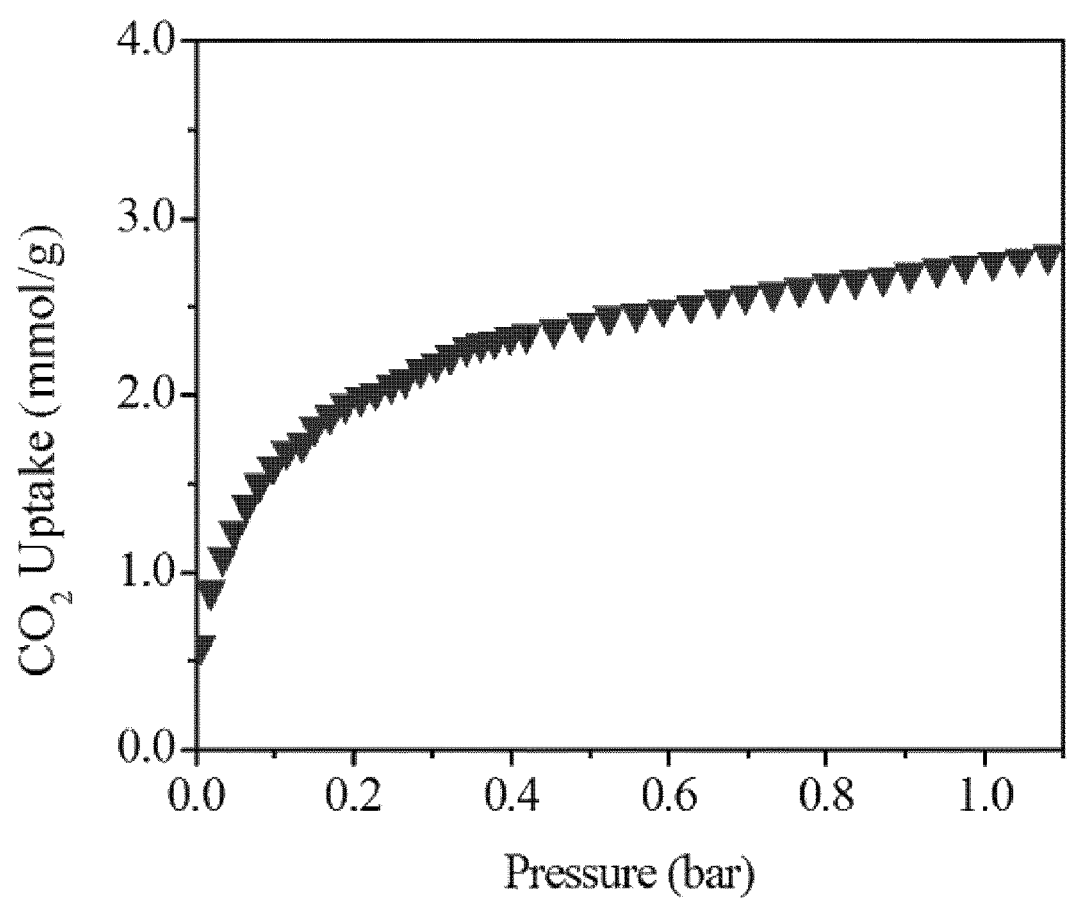

To evaluate the PST-20 zeolite prepared in Example 2 in regards to the adsorption of carbon dioxide gas, 100 mg of the zeolite specimen was put into a quartz tube, which was then heated up to 250° C. at the rate of 10° C./min under the reduced pressure of 0.009 torr and maintained at 250° C. for 2 hours to achieve a complete dehydration. The dehydrated zeolite was cooled down to the room temperature under vacuum and maintained at 25° C. using a water circulator to measure the adsorbed amount of carbon dioxide while the pressure of the carbon dioxide gas was continuously varied. The measurement results are presented in FIG. 10, according to which the adsorbed amount of carbon dioxide was 1.7 mmol/g (37.8 cm$^3$/g) at 0.1 bar (75 Torr) and 2.8 mmol/g (62.6 cm$^3$/g) at 1.0 bar (750 Torr).

Example 7-1: Adsorption of Nitrogen

Figure 11:
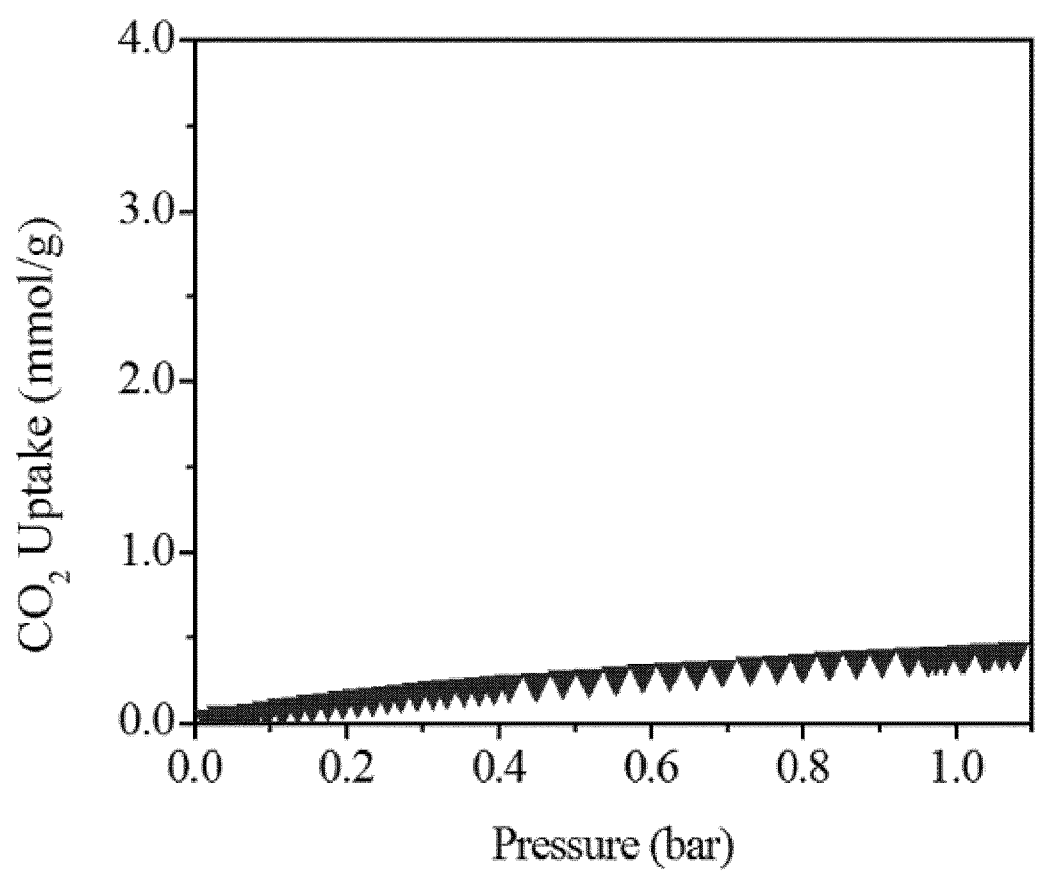

To evaluate the PST-20 zeolite prepared in Example 2 in regards to the adsorption of nitrogen gas, the procedures were performed in the same manner as described in Example 7 to measure the adsorbed amount of nitrogen by the PST-20 zeolite at 25° C. while the pressure of the nitrogen gas was continuously varied. The measurement results are presented in FIG. 11, according to which the adsorbed amount of nitrogen was 0.07 mmol/g (1.6 cm$^3$/g) at 0.1 bar (75 Torr) and 0.4 mmol/g (9.0 cm$^3$/g) at 1.0 bar (750 Torr).

Example 7-2: Adsorption of Methane

Figure 12:
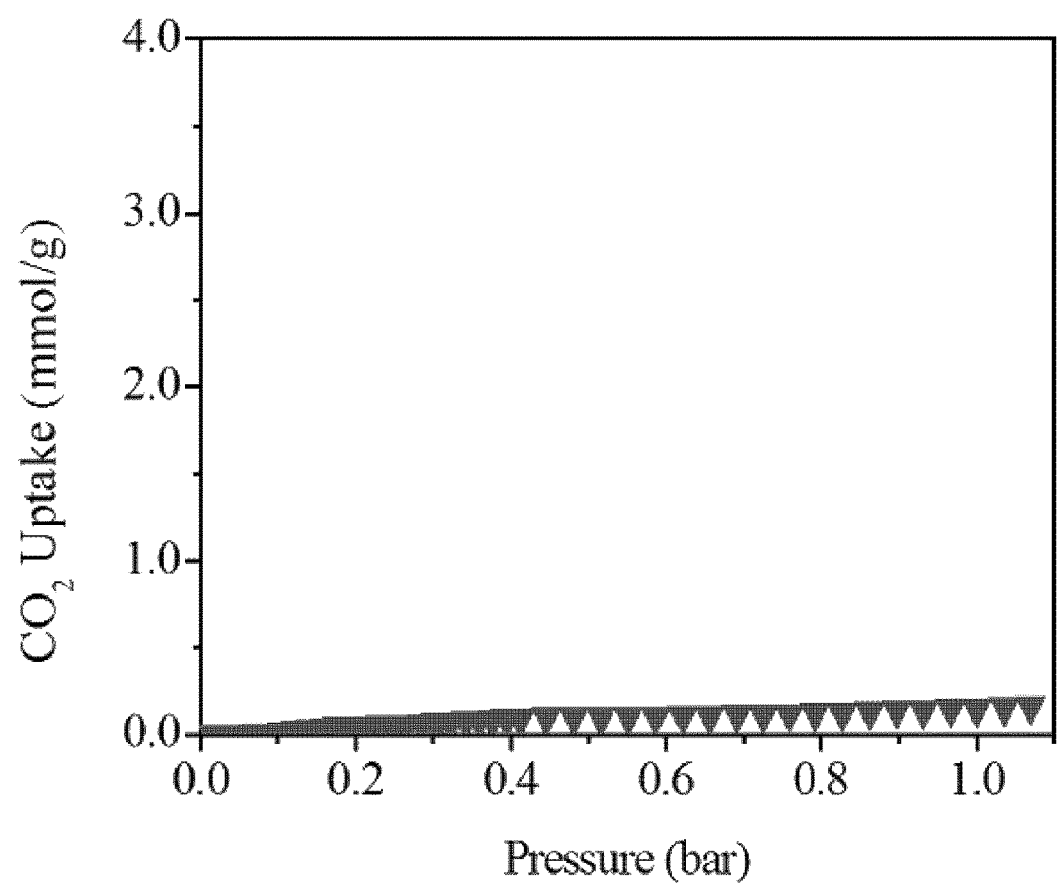

To evaluate the PST-20 zeolite prepared in Example 2 in regards to the adsorption of methane gas, the procedures were performed in the same manner as described in Example 7 to measure the adsorbed amount of methane by the PST-20 zeolite at 25° C. while the pressure of the methane gas was continuously varied. The measurement results are presented in FIG. 12, according to which the adsorbed amount of methane was 0.014 mmol/g (0.32 cm$^3$/g) at 0.1 bar (75 Torr) and 0.15 mmol/g (3.3 cm$^3$/g) at 1.0 bar (750 Torr).

Table 5 shows the selectivity for carbon dioxide against nitrogen and methane at pressure of 0.1 bar or 1.0 bar based on the adsorption for different gases as measured in Examples 78, 87-1 and 78-2. Particularly, the PST-20 zeolite had a very high selectivity for carbon dioxide at low pressure.

TABLE 5

|  | 0.1 bar | 1.0 bar |
| --- | --- | --- |
| $CO_2/N_2$ selectivity | 24 | 7 |
| $CO_2/NH_4$ selectivity | 120 | 19 |

Example 8: Calcined PST-20 and Adsorption of Carbon Dioxide Using the Same 100 mg of the PST-20 zeolite prepared in Example 2 was put into a stationary microreactor having an inner diameter of 0.64 cm. While an ammonium ($NH_3$) gas was flowing into the reactor at a rate of 50 cc/min, the reactor was heated up to 500° C. at a rate of 1° C./min and maintained at 500° C. for 4 hours to completely calcine the specimen. According to a thermogravimetric analysis and an element analysis, all the TEA cations in the PST-20 zeolite were combusted and the PST-20 zeolite contained 14.2 wt. % of water alone. The solid powder thus obtained was subjected to an X-ray diffraction analysis. The results are presented in Table 6.

TABLE 6

| 2θ | d | 100 × I/Io |
| --- | --- | --- |
| 11.5 | 7.7 | 100 |
| 12.8 | 6.9 | 79 |
| 13.1 | 6.7 | 43 |
| 14.0 | 6.3 | 45 |
| 14.1 | 6.3 | 35 |
| 16.4 | 5.4 | 37 |
| 18.1 | 4.9 | 37 |
| 19.7 | 4.5 | 30 |
| 20.1 | 4.4 | 53 |
| 20.5 | 4.3 | 26 |
| 21.6 | 4.1 | 15 |
| 22.2 | 4.0 | 16 |
| 24.2 | 3.7 | 38 |
| 26.8 | 3.3 | 16 |
| 27.7 | 3.2 | 41 |
| 28.2 | 3.2 | 82 |
| 29.3 | 3.0 | 66 |
| 29.8 | 3.0 | 47 |
| 33.7 | 2.7 | 20 |
| 34.6 | 2.6 | 27 |

Figure 13:
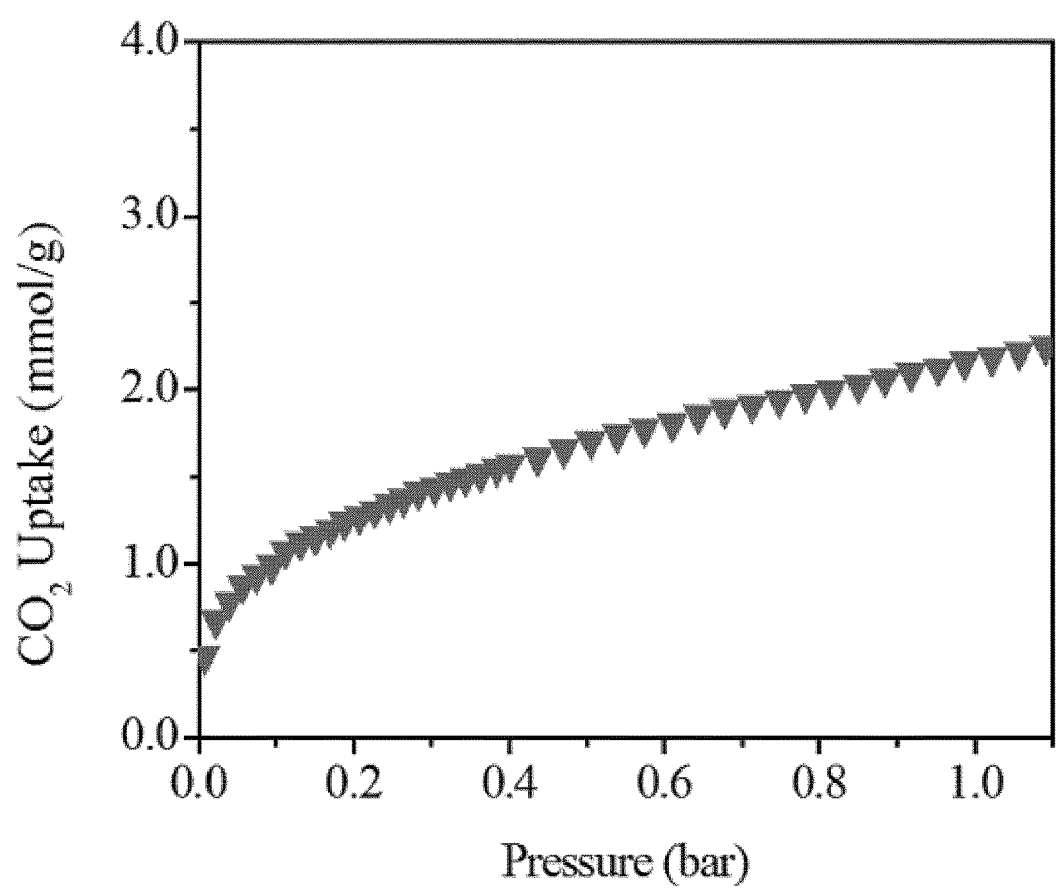

To evaluate the calcined PST-20 zeolite in regards to the adsorption of carbon dioxide gas, the procedures were performed in the same manner as described in Example 7 to measure the adsorbed amount of carbon dioxide by the PST-20 zeolite at 25° C. while the pressure of the carbon dioxide gas was continuously varied. The measurement results are presented in FIG. 13, according to which the adsorbed amount of carbon dioxide was 1.1 mmol/g (24.0 cm$^3$/g) at 0.1 bar (75 Torr) and 2.2 mmol/g (48.9 cm$^3$/g) at 1.0 bar (750 Torr). The calcined PST-20 zeolite (Example 8) had the lower adsorption of carbon dioxide than the non-calcined PST-20 zeolite (Example 7). This result presumably comes down to the fact that the crystallinity of the PST-20 zeolite was deteriorated due to the heat generated from the combustion of the organic substances by the oxygen in the air at 500° C.

Example 9: Adsorption of Carbon Dioxide Using Ion-Exchanged and Dehydrated PST-20

Figure 14:
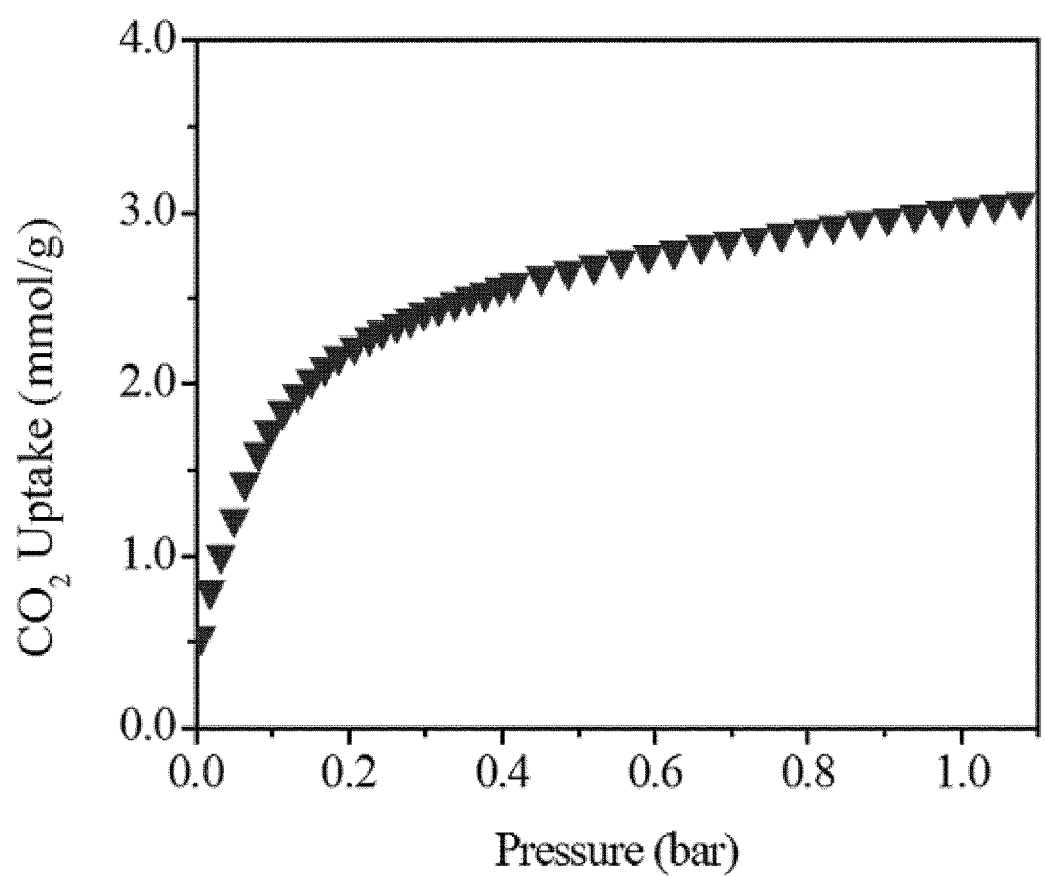

1.0 g of the PST-20 zeolite prepared in Example 2 was added to 50 ml of a 1.0M solution of sodium nitrate ($NaNO_3$) and subjected to ion exchange at 80° C. for 6 hours to yield a solid product. The solid product thus obtained was repeatedly washed with water and dried at the room temperature. 100 mg of the zeolite specimen (Na-PST-20) prepared by performing these procedures twice was put into a quartz tube, which was then heated up to 250° C. at the rate of 10° C./min under the reduced pressure of 0.009 torr and maintained at 250° C. for 2 hours to achieve a complete dehydration. The dehydrated zeolite was cooled down to the room temperature under vacuum and maintained at 25° C. using a water circulator to measure the adsorbed amount of carbon dioxide while the pressure of the carbon dioxide gas was continuously varied. The measurement results are presented in FIG. 14, according to which the adsorbed amount of carbon dioxide was 1.8 mmol/g (41.3 cm$^3$/g) at 0.1 bar (75 Torr) and 3.0 mmol/g (67.8 cm$^3$/g) at 1.0 bar (750 Torr).

Example 10: Adsorption of Carbon Dioxide Using Dehydrated PST-20

Figure 15:
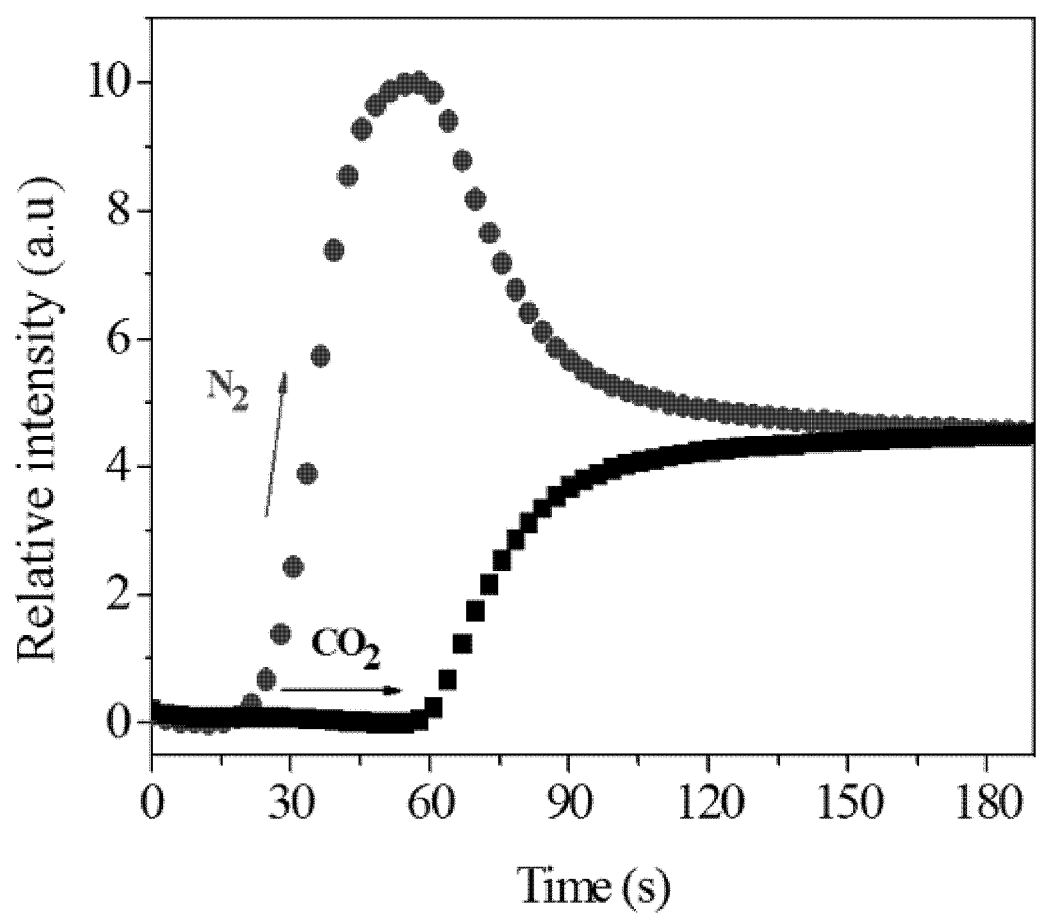
FIG. 15 is the fracture curve showing the results of an analysis on mixed gases of carbon dioxide and nitrogen passing through a reactor containing a PST-20 zeolite at the room temperature with an elapse of time, according to Example 10.

300 mg of the PST-20 zeolite prepared in Example 2 was put into a stationary microreactor having an inner diameter of 0.64 cm. While a helium gas was flowing into the reactor at a rate of 100 cc/min, the reactor was heated up to 250° C. at a rate of 2° C./min and maintained at 250° C. for 6 hours to completely dehydrate the specimen. The specimen was cooled down to the room temperature in an atmosphere of helium. Subsequently, mixed gases of carbon dioxide and nitrogen were flowed into the reactor at a rate of 20 cc/min. The amount of the gas passing through the reactor was analyzed using a mass spectrometer (Pfeiffer Prisma QMS 200). The results are presented in FIG. 15. The mixed gases of carbon dioxide and nitrogen passing through the reactor were adsorbed onto the PST-20 zeolite at once, so both of them were not detected by the mass spectrometer. As the PST-20 zeolite stopped adsorbing nitrogen and selectively adsorbed carbon dioxide, the mass spectrometer detected the nitrogen alone. Such a selective adsorption for carbon dioxide was performed for 60 seconds, and the carbon dioxide together with the nitrogen was detected by the mass spectrometer immediately after the completion of the adsorption (saturation) of carbon dioxide into the zeolite. This shows the excellent selective adsorption and separation performance of the PST-20 zeolite for carbon dioxide out of the mixed gases of carbon dioxide and nitrogen. Accordingly, there is provided the use of the PST-20 zeolite as a separator and/or adsorbent considerably available in the process of separating and collecting carbon dioxide.

Example 11

Figure 16:
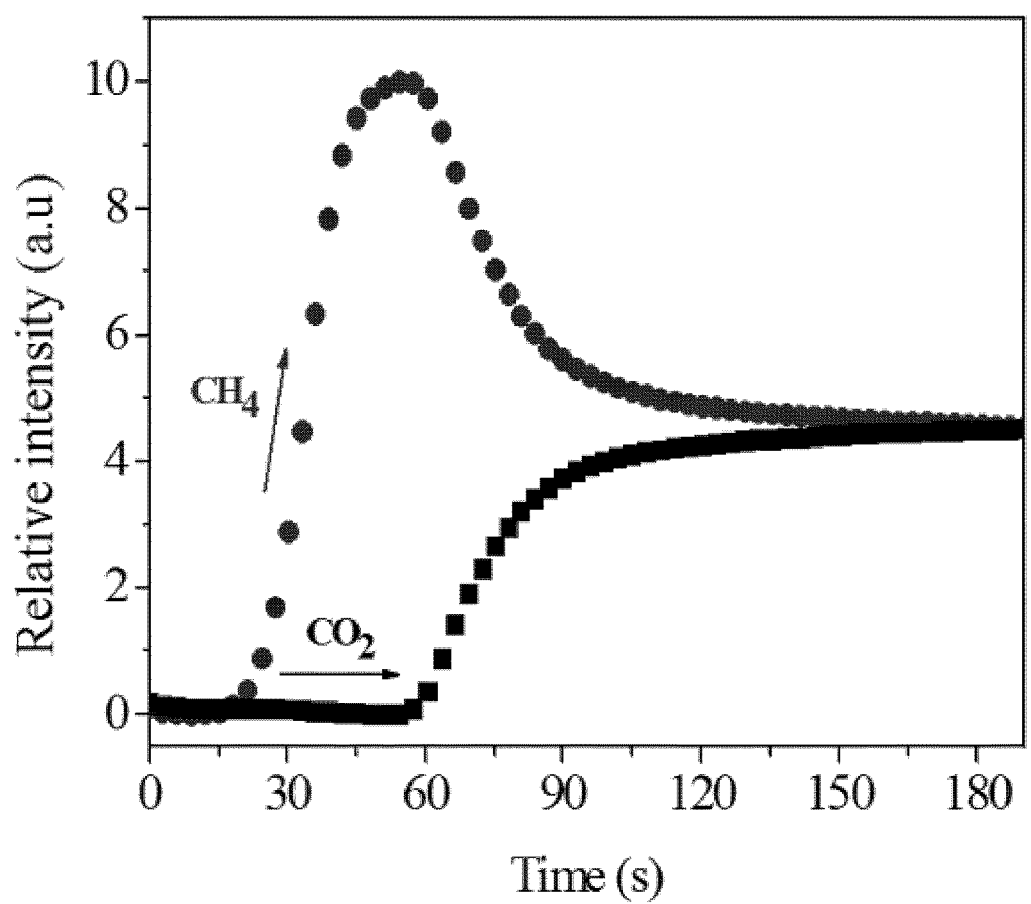
FIG. 16 is the fracture curve showing the results of an analysis on mixed gases of carbon dioxide and methane passing through a reactor containing a PST-20 zeolite at the room temperature with an elapse of time, according to Example 11.

300 mg of the PST-20 zeolite prepared in Example 2 was put into a stationary microreactor having an inner diameter of 0.64 cm. While a helium gas was flowing into the reactor at a rate of 100 cc/min, the reactor was heated up to 250° C. at a rate of 2° C./min and maintained at 250° C. for 6 hours to completely dehydrate the specimen. The specimen was cooled down to the room temperature in an atmosphere of helium. Subsequently, mixed gases of carbon dioxide and nitrogen were flowed into the reactor at a rate of 20 cc/min. The amount of the gas passing through the reactor was analyzed using a mass spectrometer (Pfeiffer Prisma QMS 200). The results are presented in FIG. 16. The mixed gases of carbon dioxide and nitrogen passing through the reactor were adsorbed onto the PST-20 zeolite at once, so both of them were not detected by the mass spectrometer. As the PST-20 zeolite stopped adsorbing nitrogen and selectively adsorbed carbon dioxide, the mass spectrometer detected the nitrogen alone. Such a selective adsorption for carbon dioxide was performed for 60 seconds, and the carbon dioxide together with the nitrogen was detected by the mass spectrometer immediately after the completion of the adsorption (saturation) of carbon dioxide into the zeolite. This shows the excellent selective adsorption and separation performance of the PST-20 zeolite for carbon dioxide out of the mixed gases of carbon dioxide and nitrogen. Accordingly, there is provided the use of the PST-20 zeolite as a separator and/or adsorbent considerably available in the process of separating and collecting carbon dioxide.

Example 12

Figure 17:
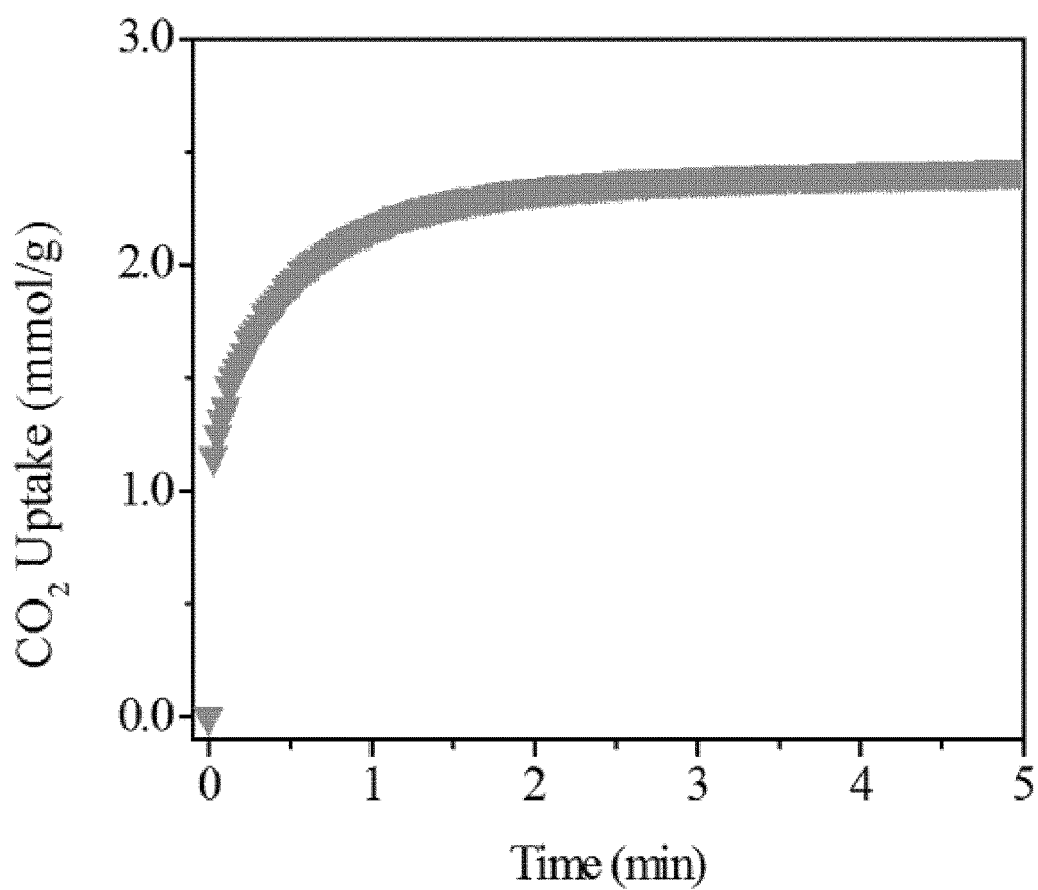
FIG. 17 is a curve plotting the time taken for a PST-20 zeolite to adsorb carbon dioxide and come to the equilibrium pressure of 1.2 bar at the room temperature of 25° C., according to Example 12.

130 mg of the PST-20 zeolite prepared in Example 2 was put into a 5 ml autoclave. Under the reduced pressure of 0.009 torr, the autoclave was heated up to 200° C. at a rate of 10° C./min and maintained at 200° C. for 6 hours to achieve a complete dehydration. The dehydrated specimen was cooled down to the room temperature under vacuum and maintained at 25° C. using a water circulator. Subsequently, a pressure of 2.7 bar was applied to the autoclave containing the specimen in a 12.39 ml reservoir, and a measurement was performed to determine the time taken for the final equilibrium pressure of the reservoir and the autoclave to reach 1.2 bar due to the adsorption of carbon dioxide by the specimen under the defined pressure. The measurement results are presented in FIG. 17. The equilibrium pressure of 1.2 bar was maintained as the PST-20 zeolite adsorbed carbon dioxide to reach a saturation of carbon dioxide within 3 minutes. This implicitly shows that the PST-20 zeolite adsorbed carbon dioxide very fast.

What is claimed is:
1. A PST-20 zeolite having a composition represented by the following chemical formula (I),

$$0.1\sim10 M_xO: 1.0\ Al_2O_3: 1.0\sim100 SiO_2 \quad (I)$$

wherein M is at least one selected from monovalent or divalent metal elements; and X is 1 or 2,
the PST-20 zeolite having a skeletal structure according to an XRD pattern presented in the following table 1,

TABLE 1

| 2θ | d | 100 × I/Io |
|---|---|---|
| 11.3~11.4 | 7.8~7.7 | S~VS |
| 12.0~12.1 | 7.4~7.3 | W |
| 12.7~12.8 | 7.0~6.9 | VS |
| 13.6~13.7 | 6.5~6.4 | S |
| 14.2~14.3 | 6.3~6.2 | W |
| 16.1~16.2 | 5.5~5.4 | M |
| 16.4~16.5 | 5.4~5.3 | W |
| 17.8~17.9 | 5.0~4.9 | VS |
| 19.3~19.4 | 4.6~4.5 | M~S |
| 19.7~19.8 | 4.5~4.4 | VS |
| 21.1~21.2 | 4.2~4.1 | W~M |
| 21.7~21.8 | 4.1~4.0 | M |
| 22.5~22.6 | 4.0~3.9 | W~M |
| 23.8~23.9 | 3.8~3.7 | M~S |
| 25.8~25.9 | 3.5~3.4 | W |
| 27.2~27.3 | 3.3~3.2 | S~VS |
| 27.7~27.8 | 3.3~3.2 | VS |
| 28.3~28.4 | 3.2~3.1 | S |
| 28.7~28.8 | 3.2~3.1 | VS |
| 29.2~29.3 | 3.1~3.0 | M~S |
| 32.2~32.3 | 2.8~2.7 | W~M |
| 32.6~32.7 | 2.8~2.7 | W |
| 33.1~33.2 | 2.8~2.7 | M~S |
| 33.9~34.0 | 2.7~2.6 | M~S |
| 34.0~34.1 | 2.7~2.6 | M~S | wherein θ is the Bragg angle; d is the lattice interval; and I is the intensity of an X-ray diffraction peak,
wherein all the powder X-ray diffraction data reported in the present invention including this powder X-ray diffraction pattern are measured using the standard X-ray diffraction method, using copper Kα radiation as a light source and an X-ray tube operated at 40 kV and 30 mA,
wherein the measurement is performed at a rate of 5 degree (2θ)/min from a powder specimen horizontally compressed,
wherein d and I are calculated from the 2θ value and the peak height of the observed X-ray diffraction peak,
wherein in terms of 100 I/Io, W is for weak (0~20); M is for medium (20~40); S is for strong (40~60); and VS is for very strong (60~100).

2. The PST-20 zeolite as claimed in claim 1, wherein the PST-20 zeolite has a ratio of $Al_2O_3$ to $SiO_2$ in the range of 1:2~50,
wherein 2θ, d and 100 I/Io of the table 1 are represented as in the following table 2,

TABLE 2

| 2θ | d | 100 × I/Io |
|---|---|---|
| 11.3~11.4 | 7.8~7.7 | 60~65 |
| 12.0~12.1 | 7.4~7.3 | 10~15 |
| 12.7~12.8 | 7.0~6.9 | 90~95 |
| 13.6~13.7 | 6.5~6.4 | 50~55 |
| 14.2~14.3 | 6.3~6.2 | 15~20 |
| 16.1~16.2 | 5.5~5.4 | 25~30 |
| 16.4~16.5 | 5.4~5.3 | 10~15 |
| 17.8~17.9 | 5.0~4.9 | 65~70 |
| 19.3~19.4 | 4.6~4.5 | 35~40 |
| 19.7~19.8 | 4.5~4.4 | 65~70 |
| 21.1~21.2 | 4.2~4.1 | 15~20 |
| 21.7~21.8 | 4.1~4.0 | 25~30 |
| 22.5~22.6 | 4.0~3.9 | 15~20 |
| 23.8~23.9 | 3.8~3.7 | 40~45 |
| 25.8~25.9 | 3.5~3.4 | 10~15 |
| 27.2~27.3 | 3.3~3.2 | 55~60 |
| 27.7~27.8 | 3.3~3.2 | 100 |
| 28.3~28.4 | 3.2~3.1 | 50~55 |
| 28.7~28.8 | 3.2~3.1 | 90~95 |

TABLE 2-continued

| 2θ | d | 100 × I/Io |
|---|---|---|
| 29.2~29.3 | 3.1~3.0 | 40~45 |
| 32.2~32.3 | 2.8~2.7 | 15~20 |
| 32.6~32.7 | 2.8~2.7 | 10~15 |
| 33.1~33.2 | 2.8~2.7 | 40~45 |
| 33.9~34.0 | 2.7~2.6 | 40~45 |
| 34.0~34.1 | 2.7~2.6 | 40~41 | wherein θ is the Bragg angle; d is the lattice interval; and I is the intensity of an X-ray diffraction peak, wherein all the powder X-ray diffraction data reported in the present invention including this powder X-ray diffraction pattern are measured using the standard X-ray diffraction method, using copper Kα ray as a light source and an X-ray tube operated at 40 kV and 30 mA, wherein the measurement is performed at a rate of 5 degree (2θ)/min from a powder specimen horizontally compressed, wherein d and I are calculated from the 2θ value and the peak height of the observed X-ray diffraction peak.

3. The PST-20 zeolite as claimed in claim 2, wherein the PST-20 zeolite belongs to a space group Im3m with a cubic crystal system, wherein the lengths a, b and c of crystal axes of a unit cell are all 50 Å or greater.

4. The PST-20 zeolite as claimed in claim 3, wherein the lengths a, b and c of crystal axes of a unit cell are 50 Å.

* * * * *